Patented July 17, 1934

1,967,121

UNITED STATES PATENT OFFICE 1,967,121

METHOD OF RECOVERING CAROTENE

Harry N. Holmes, Oberlin, Ohio, and Henry M. Leicester, San Francisco, Calif., assignors, by direct and mesne assignments, to S. M. A. Corporation, Cleveland, Ohio, a corporation of Ohio No Drawing. Application July 31, 1931, Serial No. 554,374

2 Claims. (Cl. 260—167)

This invention relates to the recovery or extraction of carotene from carrots or other suitable plant substances, its object being to provide an improved method of recovering carotene in maximum quantities and without material loss by a method which can be performed conveniently and at relatively low cost and in a manner to produce either a crude or substantially pure product.

Carotene is a valuable plant constituent, by reason of the fact that research indicates that in the animal body it is converted into the valuable and desirable vitamin A. It occurs in many plants, frequently with chlorophyll and/or xanthophyll, as in spinach or other green leaves, where the green color obscures or masks its characteristic orange or dark red color, but it is also an important constituent of carrots and is largely responsible for their color.

Because of the relatively large quantity of carotene present in carrots and their comparative freedom from green plant pigments, they are eminently suitable for commercial recovery of carotene and are here referred to specifically, but not in any sense of limitation, as illustrative of the class of plants or vegetables suitable for the purpose.

According to our method, the raw, undried plants or vegetables, such as carrots, relatively free from chlorophyll or other green plant pigments, are first cooked thoroughly in any suitable manner to avoid access of air and the consequent oxidation and destruction of carotene, which heretofore so largely have prevented its recovery by economic processes. The cooking may be of the same character practiced in ordinary vegetable canning factories, in a bath of steam or in steam heated water, or with the carrots sealed in containers and subjected to heat, or, our process may be performed with carrots previously cooked without access of air and then preserved in sealed containers. It is therefore possible by our method to harvest and cook the carrots when the carotene content is a maximum, leaving subsequent treatments to a later time, or, the carrots may be cooked out of contact with the air and following steps may be proceeded with immediately, or, as in cases where the crop is too large to handle, the carrots may be cooked, sealed and set aside in sealed form ready for later processing when convenient. Canned carrots, purchased in the open market, may also be employed if they have been cooked and preserved out of contact with the air.

The cooked carrots are next drained and are then pressed in a powerful press to remove as much water as possible. A hydraulic press with a pressure of 8000 pounds per square inch will remove as much as 83% of the water from canned carrots and the operation is far superior to any air drying method in preventing carotene oxidation, especially if the press is designed, as it may be, to exclude air as far as possible from contact with the carrot pulp or cake. The press cake is now mechanically disintegrated or comminuted, again, as in all stages or steps of this process, with an avoidance of open access to the air. This disintegrating step may be performed in any suitable apparatus for the purpose, such as a grinder or shredder. The ground pulp is now soaked for several hours in acetone and the mixture is filtered. On a laboratory scale about thirty grams of the disintegrated pulp was soaked for several hours in 1.25 liters of acetone and it was then filtered. The acetone, when dry or in the absence of water, is a solvent for carotene, but at this particular stage of the process the water still present in the pulp is sufficient in quantity to prevent carotene solution, so that the acetone at this stage plays the part only of a water remover, dissolving practically all of the remaining water and carrying it away with the filtrate, but without access of air as occurs in the ordinary air drying processes. Other water solvents, such as ordinary alcohol, may be employed at this point, so long as they do not take up or dissolve carotene.

The pulp is now pressed a second time and is then practically water free, though it has not been subjected to air drying, and it is now ready for maximum carotene recovery.

The dry pulp is again ground, broken up or comminuted, and is subjected to one or more treatments with a suitable carotene solvent. Either or both of acetone and petroleum ether are suitable, and several successive soakings and separations with either of these reagents will dissolve a large proportion if not all of the carotene. Digestion of the pulp in a reflux condenser with either of these reagents will also ultimately recover or collect all of the carotene. However, the simplest and most practical way of reducing bulk and securing a maximum recovery is to treat the pulp with acetone and petroleum ether. That is to say, the pulp is first soaked in acetone for a suitable period, say one half hour or more, is then filtered, and the filtrate is saved, after which the pulp is likewise soaked in petroleum ether, filtered and the filtrate saved, and so on, through a series of three, four, five, six or more treatments, until further treatment is not profitable and the pulp is practically carotene free and therefore colorless. The two reagents, of course, are used alternately.

If the two sets of filtrates, acetone and petroleum ether, are now combined and a sufficient quantity of water is added, the effect is to concentrate all the carotene in the petroleum ether phase, because water-wet acetone is not a solvent for carotene, and on addition of water the mixture separates or stratifies by gravity into layers, enabling the petroleum ether with its contained carotene to be separated from the remaining liquid.

If a pure product is not required and crude carotene is a satisfactory product, the petroleum ether solution may be evaporated to a sufficient concentration and the carotene separated by crystallization while cool, but this carotene of course carries a certain amount of other substances, such as fats and the like. To secure a pure product the petroleum ether containing the carotene is evaporated under reduced pressure to largely reduce its bulk and secure sufficient concentration of the carotene, but without immediate separation of solids. Upon addition of a large excess of absolute alcohol, a certain fatty substance or substances present in the vegetable extract (but not carotene) is precipitated. This material is removed by filtration and the filtrate is quickly placed in a container, such as in a flask, in an atmosphere of a suitable inert gas, such as $CO_2$ or nitrogen, all for the purpose of continuing to prevent oxidation and loss of carotene. The flask is set aside to cool and to remain for sometime at a lowered temperature, as in a refrigerator at a temperature of 45° C. or less. Upon standing the carotene separates as small dark red lustrous crystals whose solubility in the mixture is reduced by the presence of the alcohol.

Among advantages over other methods of isolating carotene from plants, the present method includes the following:

(a) It may be practiced with previously canned carrots if cooked with exclusion of air.

(b) The crop may be harvested and cooked when the carotene content is a maximum and then preserved for later recovery when convenient.

(c) When the crop is too heavy for immediate treatment, a part may be preserved and held back for later treatment.

(d) The water is removed without access of air or at least without material access of air by reason of the use of a powerful press and a water solvent, such as acetone, alcohol or the like, avoiding loss of carotene by oxidation.

(e) Grinding or otherwise mechanically disintegrating the pulp permits access of the solvent reagents to all particles and therefore secures maximum recovery.

(f) The carotene is fully removed by the use of solvent liquids, such as acetone or petroleum ether, and when a mixture of the two reagents is used, concentration is simplified by the addition of water to drive the carotene into the petroleum ether; addition of alcohol, which mixes with petroleum ether, simplifies precipitation and separation of fatty impurities.

(g) Reduction of bulk is accomplished and crystallization of the carotene is facilitated.

Other advantages of the method will readily occur to those skilled in the art.

By this method, in one typical extraction 7.5 grams of carotene were recovered from 100 gallons of commercially canned carrots.

What we claim is:

1. The method of recovering carotene from plant substances, which are relatively free from green plant pigments, consisting in cooking the substance with exclusion of air, pressing the substance to remove a large proportion of water, adding acetone to the press cake to remove the remaining water without appreciable access of air to the substance being treated, subjecting the water-free cake to repeated alternate extractions with acetone and petroleum ether, mixing all of the extractions, adding water to drive the carotene into the petroleum ether, separating the latter from the mixture and concentrating to precipitate carotene while still excluding air.

2. The method of recovering carotene from carrots, consisting in cooking the carrots with exclusion of air, pressing to mechanically remove a large portion of the water from the pulp, disintegrating the resulting press cake, washing with acetone to remove the remaining water, dissolving and removing the carotene from the disintegrated cake, adding an excess of alcohol to the solution to precipitate fats while maintaining the carotene in solution, filtering off the precipitated fats and cooling the filtrate to precipitate pure carotene.

HARRY N. HOLMES.
HENRY M. LEICESTER.